L. W. DODSON.
VEHICLE WHEEL.
APPLICATION FILED JUNE 29, 1916.
1,286,561.
Patented Dec. 3, 1918.
Fig. 1.
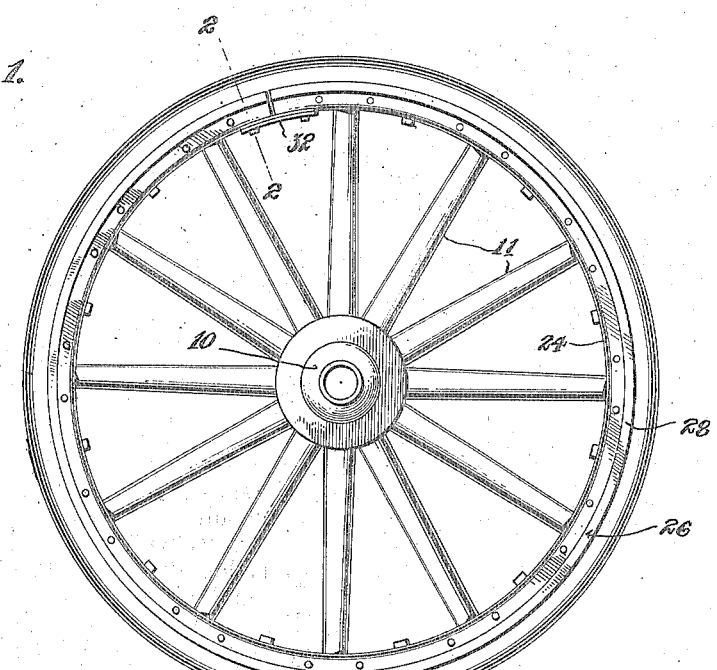
Fig. 3.
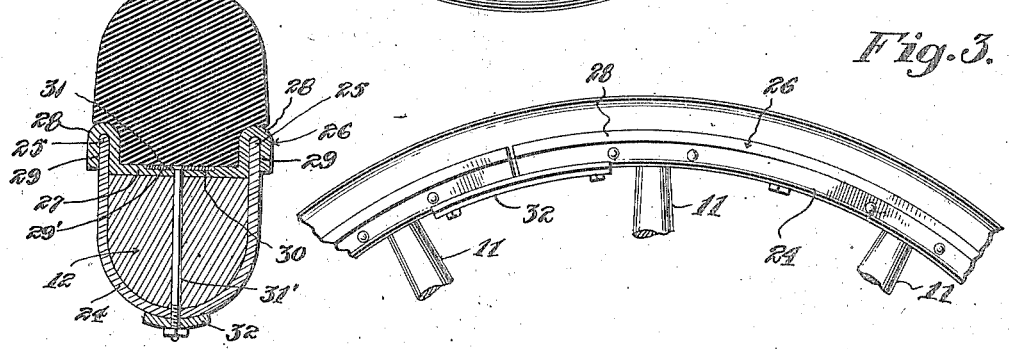
Fig. 2.
Fig. 4.
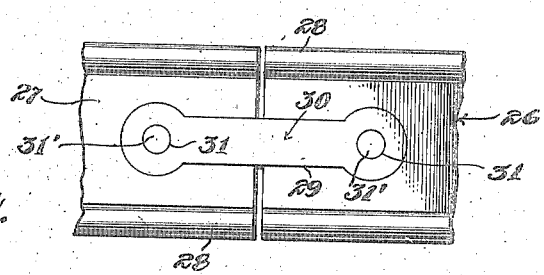
Witnesses
Inventor
L. W. Dodson
By
Attorneys

UNITED STATES PATENT OFFICE.

LUTHER W. DODSON, OF LOTTSBURG, VIRGINIA.

VEHICLE-WHEEL.

1,286,561.      Specification of Letters Patent.      Patented Dec. 3, 1918.

Application filed June 29, 1916. Serial No. 106,659.

*To all whom it may concern:*

Be it known that I, LUTHER W. DODSON, a citizen of the United States, residing at Lottsburg, in the county of Northumberland, State of Virginia, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels generally, but is directed more particularly to a novel mechanism for connecting a rubber tire thereto.

An object of the present invention is to provide a wheel in which means of novel construction and arrangement are embodied for retaining the rim and consequently the tire against accidental displacement from the wheel.

A further object of the invention is to provide a metallic casing of improved construction for inclosing the main rim of the wheel, said casing embodying separable elements one of which constitutes a supplemental or tire receiving rim.

A still further object is to provide a vehicle wheel which is composed of a minimum number of parts, and is therefore simple in construction and cheap to manufacture.

With the above and other objects of similar nature in view, the invention consists in the construction, combination and arrangement of parts, set forth in and falling within the scope of the appended claim.

In the drawing:—

Figure 1 is an elevation of the present invention applied to a wheel.

Fig. 2 is a section on line 2—2 of Fig. 1.

Fig. 3 is an enlarged fragmentary elevation.

Fig. 4 is an elevation of the attaching plate and the ends of the rim.

Referring now to the drawings, there is shown a wheel including a hub 10 provided with radial spokes 11, the latter carrying a felly 12 at their outer ends.

Surrounding the inner and side faces of the felly 12, there is a metallic casing, formed of sheet metal bent into U-shape in cross section to conform to the shape of the felly. This casing is indicated at 24, and its side portions extend beyond the outer face of the felly, as shown at 25.

Fitting snugly against the outer face of the felly 12, there is an element 26, also formed of sheet metal, and bent to form in cross section, a channel-shaped tire receiving rim 27, having its side flanges 28 rebent in spaced relation to form inwardly opening channels 29 which snugly receive the edge portions 25 of the casing 24.

Both the casing 24 and the element 26 are split transversely at corresponding points, as shown, and for securing together the resultant ends of both, the bottom of the rim 27 which is formed by the element 26 is longitudinally grooved as shown at 29', and countersunk within this groove, there is a plate 30, provided with spaced apertures 31 for the reception of bolts 31' therethrough. These bolts also pass through the element 26, the felly and the casing 24, and engaged with the bolts inwardly of the casing, there is a plate 32, which extends over the end portions of the casing at opposite sides of its split, as shown. The parts are thus securely fastened against displacement.

What I claim is:—

In a vehicle wheel, the combination with the felly thereof, of a casing embracing the felly and having circumferential side edges extending beyond the outer periphery of the felly, an annular band concentrically of the felly having channeled edge portions receiving the edges of the casing, the channeled portions being outwardly offset from the band to provide a seat therebetween, a resilient tire encircling the band and engaged in the seat formed by the channeled portions, said casing and band being transversely split, an attaching plate for joining the ends of the casing, a companion plate countersunk within the band and extending oppositely of the split therein, and bolt members passing through the felly and through the plates respectively.

In testimony whereof I affix my signature, in the presence of two witnesses.

LUTHER W. DODSON.

Witnesses:
   A. K. CRALLÉ,
   WM. J. CRALLÉ.